(12) United States Patent
Dal Prà et al.

(10) Patent No.: US 10,105,916 B2
(45) Date of Patent: *Oct. 23, 2018

(54) BICYCLE COMPONENT AND METHOD FOR MANUFACTURING SUCH A COMPONENT

(75) Inventors: Giuseppe Dal Prà, Vicenza (IT); Paolo Dettori, Vicenza (IT); Mauri Feltrin, Vicenza (IT)

(73) Assignee: CAMPAGNOLO S.R.L., Vicenza (IT)

( * ) Notice: Subject to any disclaimer, the term of this patent is extended or adjusted under 35 U.S.C. 154(b) by 636 days.

This patent is subject to a terminal disclaimer.

(21) Appl. No.: 13/245,351

(22) Filed: Sep. 26, 2011

(65) Prior Publication Data

US 2012/0064284 A1  Mar. 15, 2012

Related U.S. Application Data

(63) Continuation of application No. 10/861,206, filed on Jun. 4, 2004, now Pat. No. 8,024,993.

(30) Foreign Application Priority Data

Jun. 11, 2003 (EP) .................................... 03425378
Aug. 1, 2003 (EP) .................................... 03425530

(51) Int. Cl.
*B32B 5/12* (2006.01)
*D04H 13/00* (2006.01)
(Continued)

(52) U.S. Cl.
CPC ............ *B29C 70/86* (2013.01); *B29C 70/081* (2013.01); *B29C 70/16* (2013.01); *B29C 70/202* (2013.01);
(Continued)

(58) Field of Classification Search
CPC ..... B29C 70/081; B29C 70/16; B29C 70/202; B29C 70/22; B29C 70/86;
(Continued)

(56) References Cited

U.S. PATENT DOCUMENTS 3,080,893 A 3/1963 Craycraft
4,237,948 A 12/1980 Jones et al.
(Continued)

FOREIGN PATENT DOCUMENTS

CN 2278644 Y 4/1998
CN 1186917 7/1998
(Continued)

OTHER PUBLICATIONS

Japanese Office Action and English translation for Appln. No. 2007-031919—dated Feb. 28, 2012.
(Continued)

*Primary Examiner* — Camie S Thompson (74) *Attorney, Agent, or Firm* — Volpe and Koenig, P.C.

(57) ABSTRACT

A bicycle component is provided comprising an elongated body consisting of structural fibers incorporated in a matrix of polymeric material and having, in an end part thereof, a seat for the mechanical coupling of the component with an element of the bicycle. Also provided in the zone between the seat and the end of the body is a continuous layer of structural fibers which surround the seat and which ensure mechanical continuity in the aforementioned zone. The central part of the component comprises at least one first layer formed of continuous structural fibers incorporated in a matrix of polymeric material and at least one second layer formed of small pieces of structural fibers incorporated in a matrix of polymeric material and arranged randomly inside the layer, such layers overlapping each other.

7 Claims, 8 Drawing Sheets (51) Int. Cl.
B29C 43/52 (2006.01)
B29C 45/14 (2006.01)
B29C 43/36 (2006.01)
B29C 70/86 (2006.01)
B29C 70/08 (2006.01)
B29C 70/16 (2006.01)
B29C 70/20 (2006.01)
B29C 70/22 (2006.01)
B29C 70/46 (2006.01)
B62K 19/16 (2006.01)
B62M 3/00 (2006.01)
B29L 31/30 (2006.01)
B29L 31/06 (2006.01)

(52) U.S. Cl.
CPC .............. *B29C 70/22* (2013.01); *B29C 70/46* (2013.01); *B62K 19/16* (2013.01); *B62M 3/00* (2013.01); *B29L 2031/06* (2013.01); *B29L 2031/3091* (2013.01); *Y10T 74/2164* (2015.01); *Y10T 428/24132* (2015.01); *Y10T 428/249939* (2015.04); *Y10T 442/60* (2015.04)

(58) Field of Classification Search
CPC .............. B29L 2031/3091; B62M 3/00; Y10T 428/24132; Y10T 428/249939; Y10T 74/2164; B32B 5/12
USPC .............................. 428/297.1, 114; 74/594.1
See application file for complete search history.

(56) References Cited

U.S. PATENT DOCUMENTS

| | | | |
|---|---|---|---|
| 4,339,490 A | 7/1982 | Tada et al. | |
| 4,414,860 A | 11/1983 | Brunsch et al. | |
| 4,657,795 A | 4/1987 | Foret | |
| 4,671,336 A | 6/1987 | Anahara et al. | |
| 4,811,626 A | 3/1989 | Bezin | |
| 4,850,607 A * | 7/1989 | Trimble | B29C 70/342 280/281.1 |
| 4,856,801 A | 8/1989 | Hollingsworth | |
| 4,900,048 A * | 2/1990 | Derujinsky | B62K 19/16 138/116 |
| 5,009,734 A * | 4/1991 | Therond | E04H 12/24 156/184 |
| 5,215,322 A | 6/1993 | Enders | |
| 5,271,784 A | 12/1993 | Wu et al. | |
| 5,435,869 A | 7/1995 | Christensen | |
| 5,624,519 A | 4/1997 | Nelson et al. | |
| 5,632,940 A | 5/1997 | Whatley | |
| 5,667,857 A | 9/1997 | Watanabe et al. | |
| 5,851,459 A | 12/1998 | Chen | |
| 6,265,333 B1 * | 7/2001 | Dzenis et al. | 442/346 |
| 6,268,047 B1 * | 7/2001 | Mulder | B29C 70/081 428/298.1 |
| 6,305,243 B1 | 10/2001 | Chiang | |
| 6,324,940 B1 | 12/2001 | Pazdirek et al. | |
| 6,443,033 B1 | 9/2002 | Brummer et al. | |
| 6,564,675 B1 | 5/2003 | Jiang | |
| 6,924,021 B1 | 8/2005 | Colegrove et al. | |
| 7,000,499 B2 | 2/2006 | Valle | |
| 7,013,753 B2 | 3/2006 | Valle | |
| 7,070,376 B1 | 7/2006 | Toback | |
| 7,614,706 B2 * | 11/2009 | Meggiolan et al. | 301/95.102 |
| 8,024,993 B2 * | 9/2011 | Dal Pra et al. | 74/594.1 |
| 2003/0019324 A1 | 1/2003 | Valle | |
| 2003/0061900 A1 | 4/2003 | Smith | |
| 2003/0087572 A1 | 5/2003 | Balthes et al. | |
| 2004/0149076 A1 | 8/2004 | Yamanaka | |
| 2004/0177717 A1 | 9/2004 | Chiang | |
| 2005/0012298 A1 | 1/2005 | Dal Pra et al. | |
| 2005/0016323 A1 | 1/2005 | Dal Pra' | |
| 2005/0124250 A1 * | 6/2005 | Wilson | B32B 5/08 442/327 |
| 2007/0186719 A1 | 8/2007 | Ciavatta et al. | |
| 2007/0199403 A1 | 8/2007 | Ciavatta | |
| 2007/0227293 A1 | 10/2007 | Valle | |
| 2010/0058889 A1 | 3/2010 | Dal Prà | |

FOREIGN PATENT DOCUMENTS

| | | |
|---|---|---|
| CN | 2509074 Y | 9/2002 |
| DE | 29600548 U1 | 2/1996 |
| DE | 19601125 | 7/1997 |
| EP | 0177736 | 4/1986 |
| EP | 0916477 | 5/1999 |
| EP | 1419961 A1 | 11/2002 |
| EP | 1270393 | 1/2003 |
| EP | 1270394 | 1/2003 |
| EP | 1281609 A2 | 2/2003 |
| EP | 1281609 A3 | 10/2003 |
| EP | 1442974 A2 | 8/2004 |
| EP | 1486413 A2 | 12/2004 |
| FR | 2416829 | 9/1979 |
| FR | 2636386 | 3/1990 |
| FR | 2722753 | 7/1994 |
| FR | 2722753 | 1/1996 |
| JP | 57-111694 | 7/1982 |
| JP | 60-022323 | 2/1985 |
| JP | 61-066636 | 4/1986 |
| JP | 61-135801 | 6/1986 |
| JP | 61-137634 | 6/1986 |
| JP | 04-339635 | 11/1992 |
| JP | 04-347006 | 12/1992 |
| JP | 06-321167 | 11/1994 |
| JP | 10-181662 | 7/1998 |
| JP | 11-166552 | 6/1999 |
| JP | 2003-054478 | 2/2003 |
| JP | 2003-072666 | 3/2003 |
| JP | 2003-276671 | 10/2003 |
| JP | 2006-007799 | 1/2006 |
| TW | 461866 | 11/2001 |
| WO | 9857840 | 12/1998 |

OTHER PUBLICATIONS

Japanese Office Action and English translation for App. No. 2007-031919—dated Feb. 28, 2012.
English translation dated Dec. 21, 2010 Office Action issued in corresponding Japanese Appln. No. 2004-173152.
Office Action for JP 2004-173152 dated Jan. 5, 2010.
European Search Report dated Sep. 17, 2009, European Application No. 09009916.9-1254.
European Search Report dated Oct. 15, 2009, European Application No. 09009915.1-1254.
EPO Communication dated Oct. 10, 2008.
Office Action for European Application No. 03425367.4-1254, dated Oct. 4, 2011.
English Translation of Taiwan Office Action for Application No. 098146465, dated Apr. 27, 2012.

* cited by examiner

BICYCLE COMPONENT AND METHOD FOR MANUFACTURING SUCH A COMPONENT

CROSS REFERENCE TO RELATED APPLICATION

This application is a continuation of U.S. patent application Ser. No. 10/861,206, filed Jun. 4, 2004, which is incorporated by reference as if fully set forth herein.

FIELD OF INVENTION

The present invention relates to a bicycle component that is particularly suitable for use in the assembly of bicycle parts that deal with high specific pressures. The invention also relates to a method of manufacturing such a component.

Although the exemplary component described is a pedal crank, the invention also extends to other bicycle components with requirements similar to those of a pedal crank, for example, a seat tube.

BACKGROUND

According to the prior art, different types of pedal cranks are known, having different shapes, materials and constructive techniques in order to achieve the object of reducing as much weight as possible and, at the same time, ensuring, if not even improving, the characteristics of strength and reliability.

The trend towards manufacturing lighter components has led to the use of composite materials, in particular those formed of sheets of plastic resin material, incorporating structural fibers that contribute considerably to the structural strength of the component.

A known solution which uses the aforementioned technique is shown in published European Patent Application No. EP 1 281 609A currently assigned to Campagnolo S.r.l., wherein the body of the component is obtained by molding a thermosetting composite material inside a mold with metal inserts therein.

A suitable composite material is described in U.S. Pat. No. 4,339,490. Sheets formed of a resin matrix have differently shaped small pieces of structural fibers, of a size between 1 and 100 mm, orientated randomly into the sheet. The use of such a type of composite material for molding provides a compromise between obtaining good strength characteristics, typical of the structural fibers, and the need to keep a sufficient fluidity during molding. The size of the small pieces, allows the composite material to flow sufficiently uniformly inside the mold, creating a homogenous pedal crank body.

This molding technique, however, has some drawbacks. The molding technique used provides for arranging a predetermined amount of composite material in the central zone of the mold and, during the molding step, making such a composite material flow until the entire mold is filled, even in the end areas with the arranged metal inserts. During the molding step, the composite material flows around the metal inserts following two distinct flow paths that meet near the end of the pedal crank, completely encasing the inserts.

First, the two-pronged flow causes a disadvantageous area of discontinuity in the joint points of the two flows. Second, a disadvantage stems from the greater fluidity of the resin with respect to that of the structural fibers and due to the long route (from the center to the end of the mold), the end zones of the pedal crank have a greater percentage of resin with respect to the percentage in the rest of the pedal crank and, consequently lower strength with respect to the rest of the body. Third, a specific drawback encountered in pedal cranks obtained by molding composite material having small pieces of structural fibers is the breakage of the pedal crank in its center area. The occurrence of such a drawback is due to the fact that such a composite material with small pieces does not ensure sufficient strength in such an area of the pedal crank.

Since the ends of the pedal crank are subjected to substantial stress during pedaling, the two aforementioned drawbacks can lead to undesired breakage of the pedal crank in these areas.

SUMMARY

In a first aspect, the invention relates to a bicycle component comprising an elongated body having spaced apart first and second ends, each end defining a seat for mechanical coupling with an element of the bicycle. The component further comprises at least two layers of structural fibers incorporated in a matrix of polymeric material, at least one of the layers having randomly arranged structural fibers. At least one of the layers of structural fibers partially surround each of the seats, establishing mechanical continuity between them.

In another aspect, the invention comprises a method for manufacturing a bicycle component comprising an elongated body consisting of structural fibers incorporated in a matrix of polymeric material and having, in an end part thereof, a seat for mechanical coupling with an element of the bicycle, said method comprising the steps of:

arranging, at a first half of a mold, a continuous layer of fibers in a configuration such as to at least partially surround a seat located at a end of the mold;

closing a second half of the mold above said first half;

inserting, from an opening at said second half of the mold, a composite material comprising small lengths of structural fibers incorporated in a matrix of polymeric material and arranged randomly inside the matrix;

inserting, in said opening at said half of the mold, a plunger and subjecting said composite material to a pressure to allow the recess defined by the mold to be filled;

increasing the temperature of the mold up to a value which allows the reticulation of the polymeric material of said matrix;

moving the two parts of the mold apart and removing said component.

BRIEF DESCRIPTION OF THE DRAWINGS

Further characteristics and advantages of the invention shall become clearer from the description of some preferred embodiments, given with reference to the attached drawings, where.

DETAILED DESCRIPTION OF THE INVENTION

Figure 1:
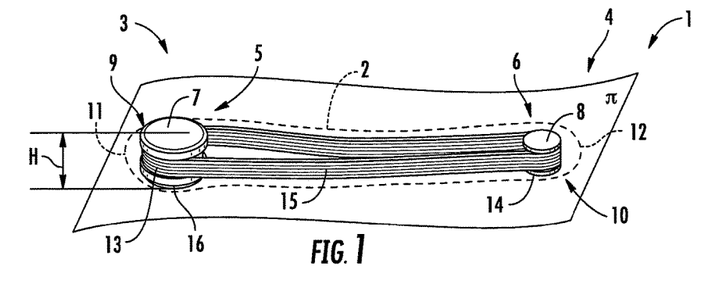
FIG. 1 represents a schematic isometric view of the component of the invention.

With reference to FIG. 1, the layers of continuous structural fibers 13 and 14 are made with unidirectional fibers orientated substantially parallel to the middle plane π through the component, in this case a pedal crank 1. Middle plane π is a substantially flat surface that intersects the pedal crank 1 longitudinally and divides it substantially in half along its height H. Given the typical shape of the pedal crank 1, such a surface is slightly curved when one moves from one end 11 to the other 12 of the pedal crank 1.

Typically, said continuous structural fibers are chosen from the group consisting of carbon fibers, glass fibers, boron fibers, aramidic fibers, ceramic fibers, carbon fiber being preferred.

Figure 2:
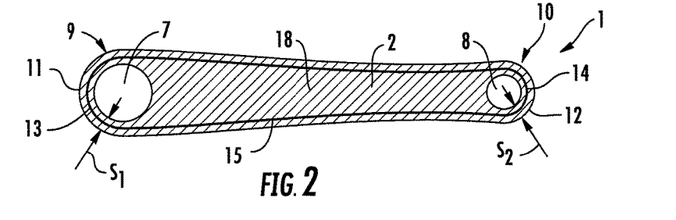
FIG. 2 represents a section view from above of the component of FIG. 1.

As it can be clearly seen in FIG. 2, the layers of continuous structural fibers 13 and 14 surround the end zones 9 and 10 of seats 5 and 6, in a single closed loop 15 of unidirectional fibers that extend longitudinally along the body 2 of the pedal crank 1. This configuration could be different, like for example a series of unidirectional structural fibers surrounding the two seats 5 and 6 according to a typical "figure-eight" configuration.

In FIG. 2, the layers of continuous structural fibers 13 and 14 are provided only in a part of the thicknesses S1 and S2 of the end zones 9 and 10 and can, at most, also be reduced to a single layer. Such layers 13 and 14 are provided only for a part of the height H of the pedal crank component 1 and are confined in height by means of an annular retainer element 16, coaxial to the insert 7.

The arrangement of a limited number of layers 13 and 14 of fibers in the pedal crank 1 implies that the inserts 7, 8 are substantially covered with the composite material 18 with which the body 2 of the pedal crank 1 is formed, as can be seen more clearly in FIG. 2.

Figure 3:
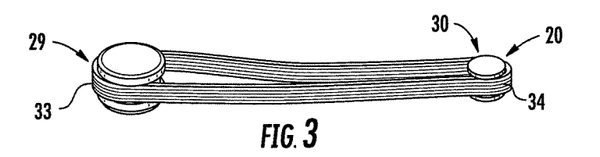
FIG. 3 represents an alternate embodiment of the component of FIG. 1.
Figure 4:
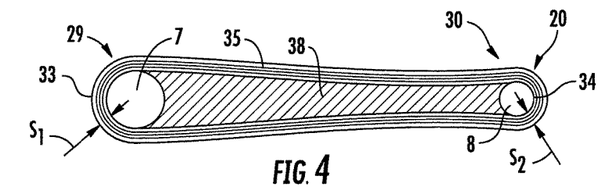
FIG. 4 represents an elevated section view of the component of FIG. 3.

A different solution is shown in FIGS. 3 and 4, wherein the layers of continuous structural fibers 33 and 34 substantially fill the thicknesses of both S1 and S2 of the end zones 29 and 30 of the pedal crank 20. In this solution the composite material 38, with which the body 2 of the pedal crank 1 is formed, is confined inside loop 35 defined by the layers of continuous fibers 33 and 34.

Figure 4A:
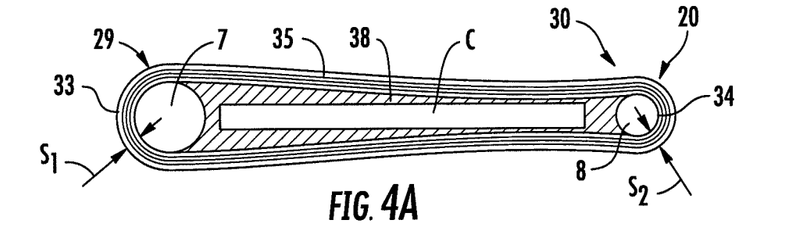
FIGS. 4A, 4B and 4C represent elevated section views of alternate embodiments of the component of FIG. 3.

The alternate embodiments shown in FIG. 4A differ from the solution shown in FIG. 4 for the fact that the body 2 has a core C filled with a material having a lower specific weight than the composite material 38.

Figure 4B:
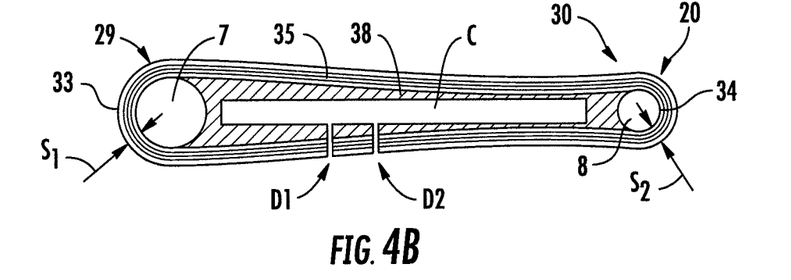
Figure 4C:
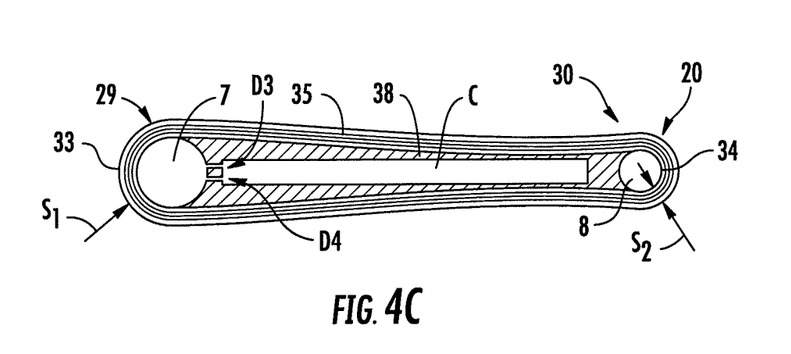

In the embodiments shown in FIG. 4B and FIG. 4C the core C is removed after molding, so that the weight of the pedal crank is reduced.

Figure 5:
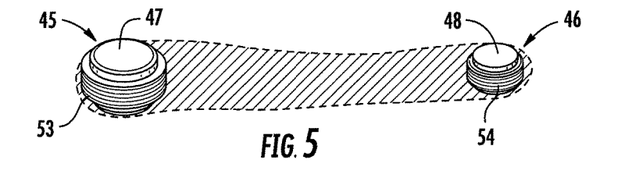
FIG. 5 represents another alternate embodiment of the component of FIG. 1.

FIG. 5 shows an alternate embodiment of the arrangement of the layers of continuous structural fibers 53 and 54 wherein the layers completely and separately surround the two seats 45 and 46 and the corresponding metal inserts 47 and 48.

As can be seen with reference to FIGS. 1-2, the component 1 has, at its end parts 3 and 4, respective seats 5 and 6 for mechanical coupling with a bottom bracket and with a pedal of the bicycle. The seats 5 and 6 incorporate cylindrical metal inserts 7 and 8 in which holes, not shown, are formed to connect the inserts 7 and 8 the bottom bracket and to the pedal, respectively.

In an alternate embodiment, the seats 5 and 6 comprise a hole of a suitable shape adapted to allow the direct connection of the pedal crank to the bottom bracket and to the pedal or else the subsequent insertion of metal inserts.

In the two end zones 9 and 10 of the pedal crank 1, between the seats 5 and 6 and ends 11 and 12 of the body 2 of the pedal crank 1, there are layers of continuous structural fibers 13 and 14 that surround the end zones 9 and 10 of the seats 5 and 6, as previously described. Such layers of continuous structural fibers 13 and 14 ensure that in such end zones 9 and 10 there is structural and mechanical continuity.

In different embodiments, the layers of continuous structural fibers can take different shapes and sizes. For example, such layers can extend, at the end zone, for the entire height H of the pedal crank 1. Moreover, such layers can be made of interwoven structural fibers according to at least two incident directions to make a fabric. In a preferred embodiment, such a fabric comprises a majority of fibers orientated according to a direction parallel to the middle plane of the pedal crank 1. Finally, it is possible that in further embodiments there are a plurality of layers of continuous structural fibers, according to any combination of the continuous layers described above.

Figure 6:
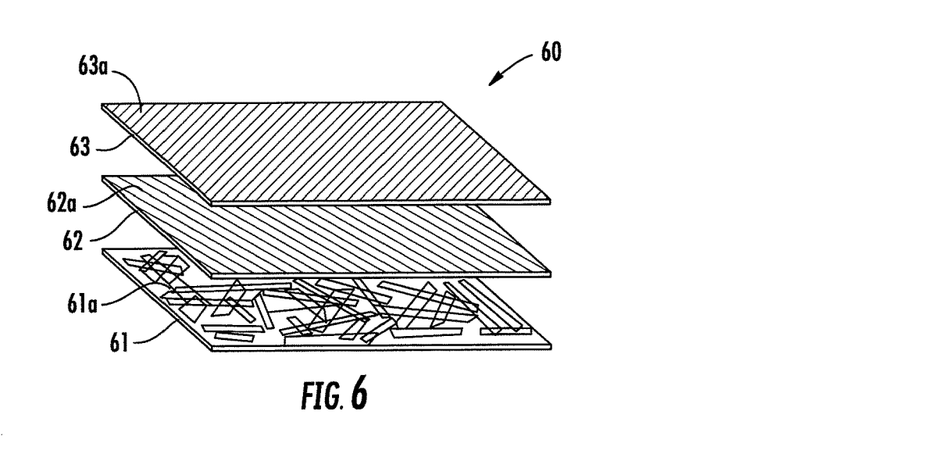
FIGS. 6 to 11 represent different isometric views of the semi-finished product of the invention.

The pedal crank 1, and specifically its elongated body 2, is formed from a semi-finished product, indicated as 60 in FIG. 6, consisting of three layers. Each of the layers is formed as a sheet of material. As used hereinafter in the description and claims, the term "sheet" refers to a defined thickness of material forming either an individual layer, or one of a plurality of independent or joined layers of a structure. One layer 61 is formed of small lengths of structural fiber 61a incorporated in a matrix of polymeric material and randomly arranged within the layer 61 and two layers 62 and 63 are formed of continuous structural fibers 62a and 63a which are incorporated in a matrix of polymeric material and orientated according to directions which are preferably angled relative to each other. The layers 61, 62 and 63 overlap one another and give the semi-finished product 60 characteristics of structural strength through the unidirectional fibers 62a and 63a and good characteristics of fluidity through the sheeted structure 61a, this last characteristic being exploited in the molding step of the pedal crank 1.

With regards to the continuous structural fiber, the small lengths of structural fibers are chosen from the group consisting of carbon fiber, glass fibers, boron fibers, aramidic fibers, and ceramic fibers, carbon fiber being preferred.

The polymeric material may be a thermosetting plastic material or a thermoplastic material.

Figure 7:
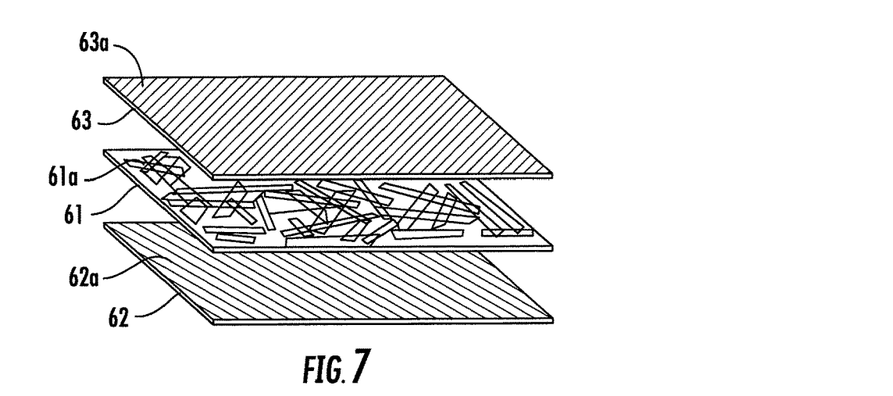

The arrangement and number of layers, as well as the directions of the structural fibers, can be chosen according to the particular properties of desired structural strength of the component. For example, in FIG. 7 layer 61 is arranged between layers 62 and 63.

Figure 8:
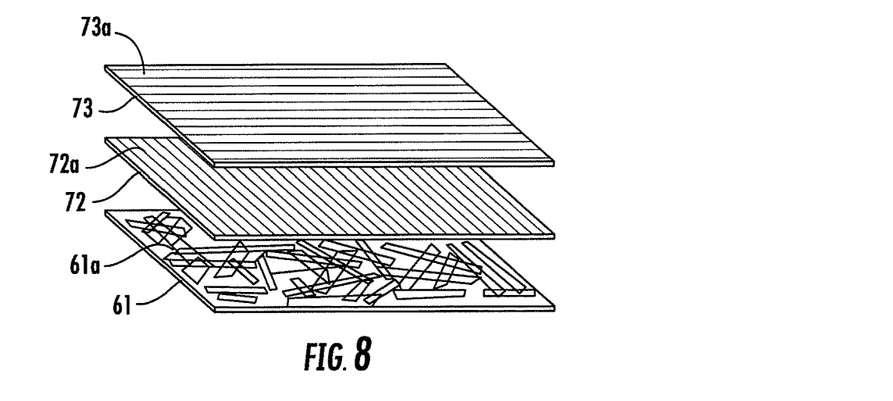

The embodiment of FIG. 8 differs from that of FIG. 6 in that the unidirectional fibers 72a and 73a are incorporated in the matrix of polymeric material of respective layers 72 and 73 in complementary directions and are respectively orientated at +90° and 0°.

Figure 9:
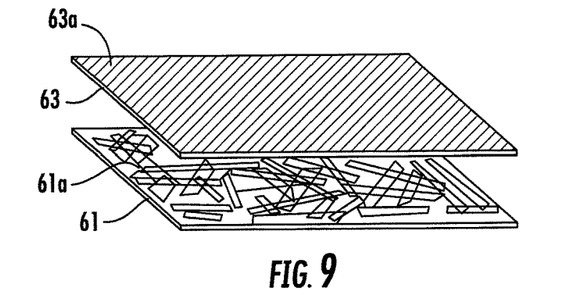

In FIG. 9 the semi-finished product comprises a layer of small lengths of structural fibers 61a incorporated in a matrix of polymeric material overlapping a single layer 63 formed of continuous structural fibers 63a orientated on a bias within layer 63.

Figure 10:
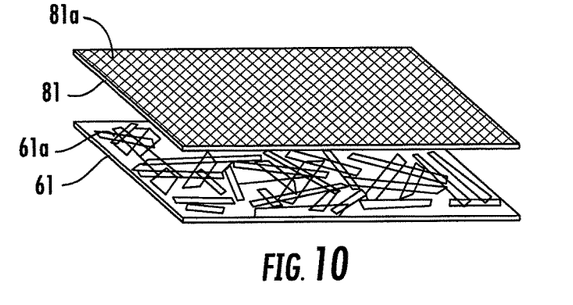

In FIG. 10 the semi-finished product comprises a layer of small lengths of structural fibers 61a and a layer 81 in which the continuous structural fibers 81a are arranged according to two incident directions and form a fabric configuration.

Figure 11:
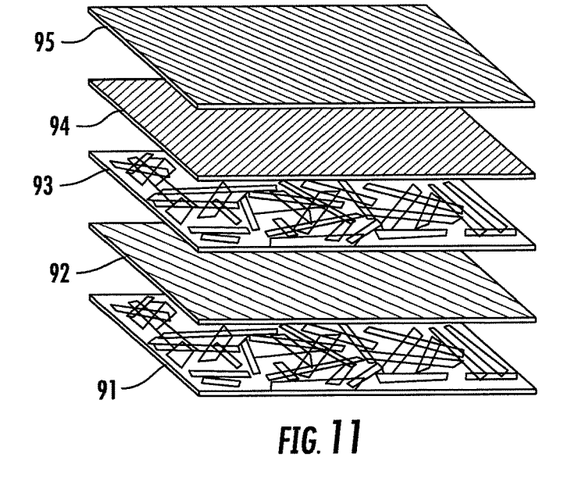

Finally, in FIG. 11 a semi-finished product formed of five layers is shown. Two layers 91 and 93 are formed of small lengths of structural fibers incorporated in a matrix of polymeric material intercalated in three layers 92, 94 and 95 formed of continuous structural fibers of adjacent layers in which the fibers are orientated at an angle relative to each other.

The semi-finished product 60 used for manufacturing the body 2 of the pedal crank 1, according to any of the above illustrated embodiments and all other possible configurations, are preferably rolled around a rolling axis before the molding step, as described below. This allows the characteristics of unidirectional strength of the structural fibers to be spatially distributed.

Figure 12:
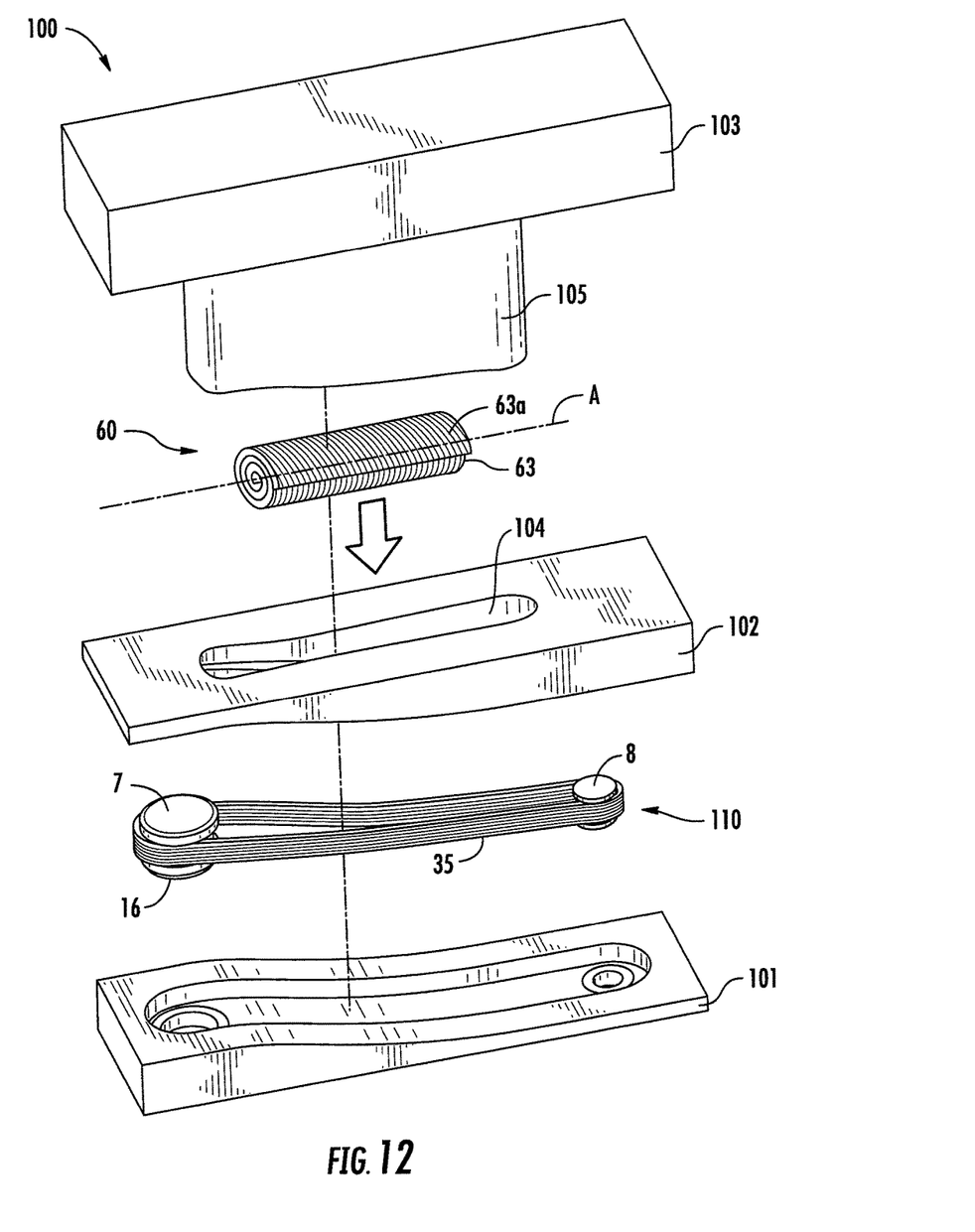
FIG. 12 represents an exploded isometric view of the mold used for manufacturing the component of the invention.

Referring now to FIG. 12, the method for manufacturing the pedal crank 20 shown in FIG. 3 is described. However, it should be understood that the same method can be used for the other embodiments shown or described, for example those of FIGS. 1 and 5.

Figure 13:
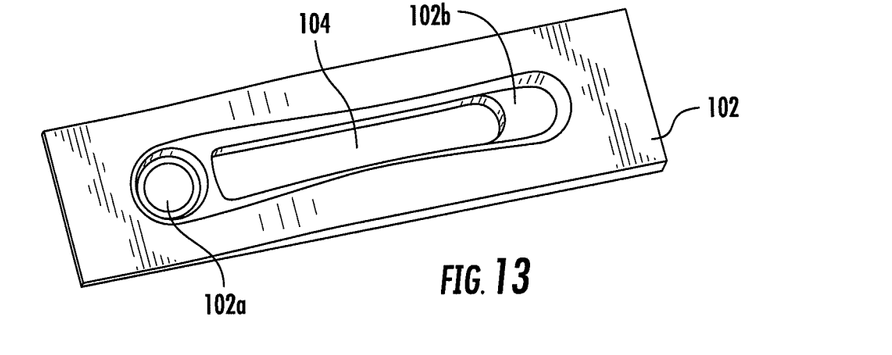
FIG. 13 represents an isometric view of a detail of FIG. 12.

The method provides for the use of a mold 100 which comprises three parts, two half-shells 101 and 102 and a plunger 103. The upper half-shell 102, as seen more clearly in the bottom view of FIG. 13, has a through-opening 104 which allows the passage and the sliding of a press element 105 of the plunger 103.

A first step of the method provides for the formation of an intermediate product 110 comprising the inserts 7 and 8 on which the layers of continuous unidirectional structural fibers are wound in a closed loop configuration 35. Such an intermediate product 110 can be realized, for example, by winding a long fiber around the inserts 7, 8 in a number of layers sufficient to obtain a desired thickness and height. In particular, the arrangement of the fibers around the insert 7 is defined through retainer loop 16 which confines them in an upper portion of the insert 7. Experience has demonstrated that it is precisely such an area that is subjected to the greatest torsional stress during pedaling, thus requiring a greater structural strength.

The intermediate product 110 thus obtained is placed inside the lower half-shell 101 above which the upper half-shell 102 is closed so that its shapings 102a and 102b (FIG. 13) are in contact with the heads of the metal inserts 7 and 8.

When the half-shells 101 and 102 of mold 100 are closed, the semi-finished product 60 previously wound around the rolling axis A is inserted in through opening 104. The winding of the semi-finished product 60 is arranged so that its outer surface consists of layer 63 formed of unidirectional fibers 63a. The semi-finished product 60 is pre-heated to ease the subsequent molding.

After its insertion in the mold 100, the wound semi-finished product 60 is then located in the zone defined between the inserts 7 and 8 and the inner part of the loop 35. When the plunger 103 is lowered, the presser tool 105 slides inside the opening 104 of the upper half-shell 102 urging the semi-finished product 60 inside the mold 100. During such a molding step, the semi-finished product 60 flows into and uniformly fills the recess defined by the two half-shells 101 and 102. The closed loop configuration 35 of the unidirectional fibers allows them to keep their continuous configuration even during molding, since the pressure forces applied by the composite material which constitutes the semi-finished product 60 are uniformly distributed along the loop 35. After insertion of the presser tool 105, the mold 100 is heated, according to known techniques, and the materials inside of mold 100 polymerizes in the desired pedal crank structure. Finally, the mold 100 is opened and the pedal crank is removed.

It is clear that for the described method any of the semi-finished products described above with reference to FIGS. 6-11 can be used, possibly even in a non-wound configuration. If one wishes to manufacture the pedal crank according to the shape shown in FIG. 5, it is then advisable for the intermediate product, in this case comprising the inserts on which the unidirectional fibers are individually wound, to undergo a prepolymerization treatment, so that the subsequent molding does not modify the shape of the wound fibers.

Alternatively, the component may further comprise a core C as depicted in FIGS. 4A, 4B and 4C. In the manufacture of the component of FIG. 4A, a mold 100 is provided, having first and second portions 101, 102 and plunger 103 as shown in FIG. 12. An intermediate product 110 is first formed comprising first and second inserts 7, 8, about which layers of continuous unidirectional structural fibers are wound in a closed loop configuration 35. A core C is then arranged in the area within the closed loop of unidirectional structural fibers.

Once the intermediate product 110 is in position in the first mold portion 101, the second portion 102 is closed above the first portion so that shapings 102a and 102b contact the upper portions of the inserts 7, 8. When the first 101 and second 102 mold portions are closed about the intermediate product 110, a composite material 38 is inserted into an opening 104 of the second portion 102 of the mold 100. The composite material 38 comprises small lengths of randomly arranged structural fibers incorporated in a matrix of polymeric material. Next, the plunger 103 is lowered, to force presser 105 into the opening 104 of the second mold portion 102. The presser 105 forces the composite material 38 into the mold 100. During this step the composite material 38 flows into the mold 100 and uniformly fills the recess defined by the first and second mold portions 101, 102 thereby enclosing the core C. With the presser 105 inserted, the mold is heated to a temperature sufficient to polymerize the composite material 38, thereby producing the desired pedal crank structure. The mold is then opened and the pedal crank is removed. The core C is made of a material having a lower specific weight than the composite material 38. The weight of the pedal crank with the core enclosed is less than the weight of the pedal crank completely made of composite material.

In the manufacture of the component of FIG. 4B, a mold 100 is provided, having first and second portions 101, 102 and plunger 103 as shown in FIG. 12. An intermediate product 110 is first formed comprising first and second inserts 7, 8, about which layers of continuous unidirectional structural fibers are wound in a closed loop configuration 35. A core C made of a removable material is then arranged in the area within the closed loop of unidirectional structural fibers. The core helps to maintain the position of the closed loop of unidirectional structural fibers 35 and inserts 7, 8.

Once the intermediate product 110 is in position in the first mold portion 101, the second portion 102 is closed above the first portion so that shapings 102a and 102b (FIG. 13) contact the upper portions of the inserts 7, 8. When the first 101 and second 102 mold portions are closed about the intermediate product 110, a composite material is inserted into an opening 104 of the second portion 102 of the mold 100. The composite material 38 comprises small lengths of randomly arranged structural fibers incorporated in a matrix of polymeric material. Next, the plunger 103 is lowered, to force presser 105 into the opening 104 of the second mold portion 102. The presser 105 forces the composite material 38 into the mold 100. During this step the composite material 38 flows into the mold 100 and uniformly fills the recess defined by the first and second mold portions 101, 102 thereby enclosing the core C. With the presser 105 inserted, the mold is heated to a temperature sufficient to polymerize the composite material 38, thereby producing the desired pedal crank structure. The mold is then opened and the pedal crank is removed.

Small openings D1, D2 are formed to remove the core material from the crank structure. The openings D1, D2 may be formed by drilling or other known methods. Two or more openings are preferred to allow for better air exchange between the core and the ambient space which aids in removing the core material. The core material may be sand, a powdered material or a metallic alloy having a low melting point. A core of sand or powdered material can be removed from the crank by falling through the openings D1, D2 under the force of gravity. If a metallic alloy is used as the core, it may be removed simply by heating the crank above the alloy's melting point and allowing the melted core to flow through the openings D1, D2. Removal of the core material may also be expedited by blowing high-pressured air or fluid through one of the openings. Once the core material has been removed, the openings are then sealed to prevent contaminants from entering the pedal crank. The weight of the pedal crank is further reduced with respect to weight of the pedal crank above described by removal of the core material.

A similar method as above for manufacturing the pedal crank of FIG. 4B can be used for manufacturing the pedal crank of FIG. 4C. In this case, rather than a metal insert, a support is used for the winding of the unidirectional fibers. The support remains incorporated in the pedal crank whereby a seat can be formed, by machining, for the insertion of a metal insert. In this embodiment, the removal of the core material takes place through openings D3 and D4 before the insertion of the metal insert.

Figure 14:
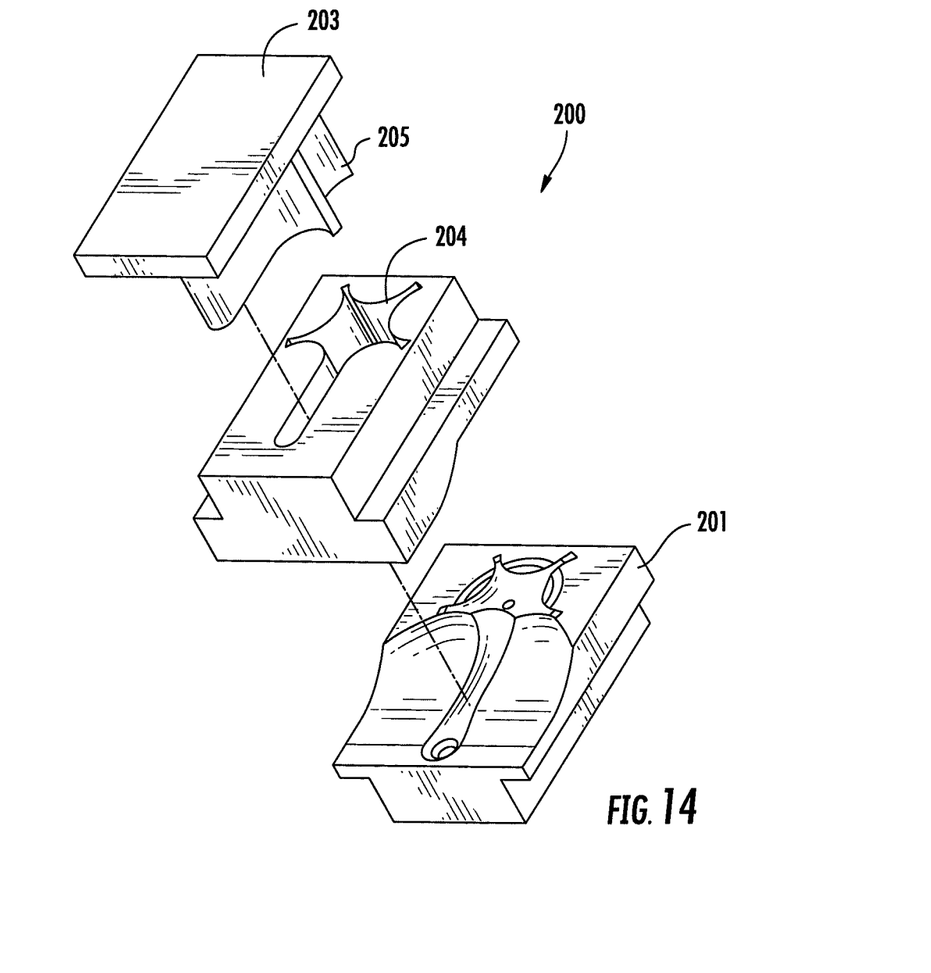
FIG. 14 represents an exploded isometric view of a mold used for manufacturing an alternate embodiment of the component of the invention.

FIG. 14 shows a variation of the mold shown in FIG. 12 which is used for manufacturing a branched pedal crank, commonly known as right pedal crank. Such a method differs from the previous one in that the semi-finished product, when inserted in the mold 200, covers the top of the metal insert intended for coupling with the bottom bracket. In this case, the metal insert can be accessed by machining away excess material left over from the molding process. Rather than the metal insert, a support can be used for the winding of the unidirectional fibers. The support remains incorporated in the pedal crank, through machining, for direct coupling with a bottom bracket or the insertion of a metal insert. It is also clear that the mold 200 can be modified so as to obtain a right pedal crank in which the insert intended for coupling with the bottom bracket is also immediately accessible.

Figure 15:
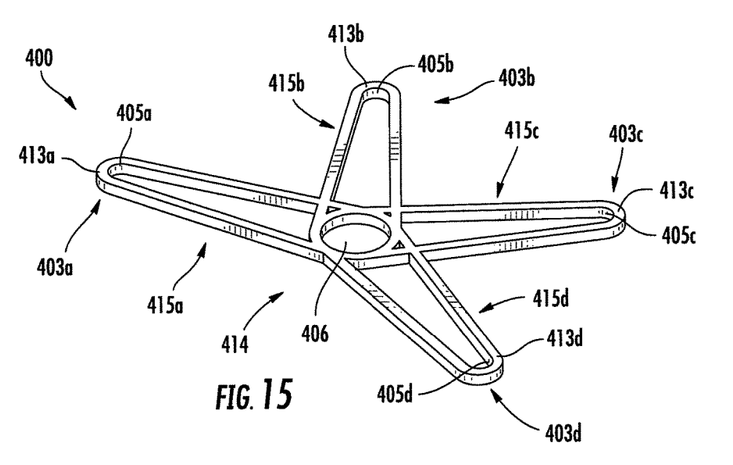
FIG. 15 represents an isometric view of an alternate embodiment relative to the progression of the continuous layers of structural fibers in a branched pedal crank.
Figure 16:
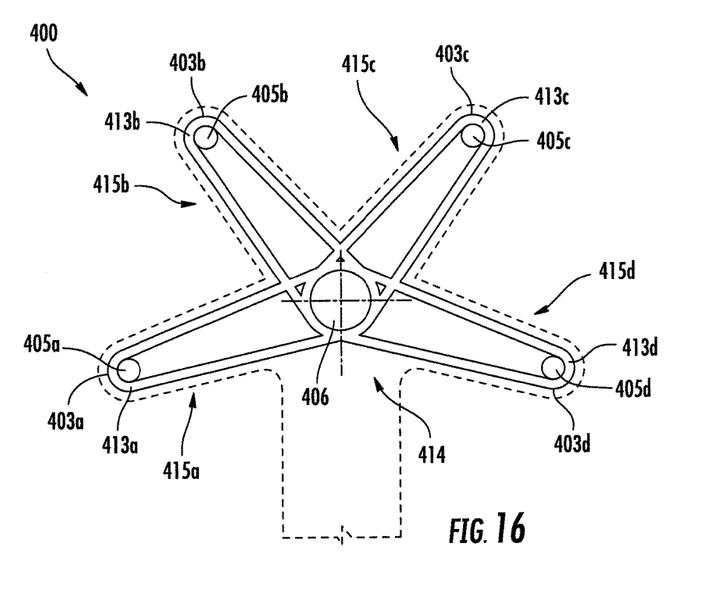
FIG. 16 represents a plan view of FIG. 15.

FIGS. 15 and 16 show the arrangement of the layers of continuous structural fibers 413a, 413b, 413c, 413d for manufacturing another branched pedal crank, commonly referred to as a right pedal crank.

In such a case it is desired to ensure high structural and mechanical continuity of end parts 403a, 403b, 403c, 403d of the spokes of intermediate product 400, four in this embodiment, where respective seats 405a, 405b, 405c, 405d which allow connection of front chain rings of the bicycle are formed. The seats 405a, 405b, 405c, 405d can incorporate respective metal inserts in which suitable holes for connection to the chain rings are formed. Alternatively, they can comprise a hole of such a suitable shape and size as to allow the direct connection of the chain rings to the branches of the pedal crank. For the sake of simplicity of explanation, no insert is shown in the figures.

As shown in FIGS. 15 and 16, the layers of continuous structural fibers 413a, 413b, 413c, 413d partially surround the seats 405a, 405b, 405c, 405d of the end parts 403a, 403b, 403c, 403d of the spokes which form an arc of circumference of about 180°. These layers are each arranged in such a way as to form respective loops 415a, 415b, 415c, 415d which close on a central zone 414 where the pedal crank has a suitable seat 406 for connecting to the bottom bracket.

The structural fibers thus arranged define an intermediate product 400 which is star-shaped. As shown in FIG. 15, intermediate product 400 is advantageously made through continuous winding, along suitable paths, of continuous layers of unidirectional fibers. The intermediate product 400 can be made either in the mold, i.e., inside the mold shown in FIG. 14, or it can be made separately using a mask which mirrors the shape of the spokes. The manufacturing of the intermediate product 400 separately allows for prior preheating of the fibers which allows them to be a pre-shaped before the positioning in loco into the mold.

The intermediate product 400 is arranged within the mold 200 on a plane overlapping the one in which the closed loop of structural fibers 15 (represented in FIG. 2) is arranged, said fibers being arranged along the elongated body 2 of the pedal crank. The configuration thus obtained allows a right pedal crank to be manufactured having the zones intended for coupling with a pedal as well as with a bottom bracket and the ends of the spokes with high structural and mechanical continuity.

Figure 17:
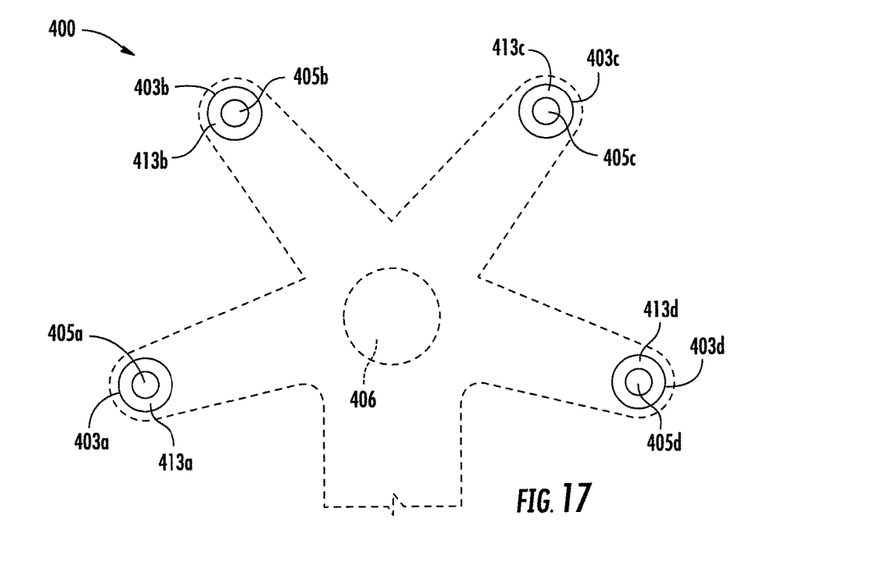
FIG. 17 represents another alternate embodiment relative to the progression of the continuous layers of structural fibers in a branched pedal crank.

In an alternate embodiment, shown in FIG. 17, each seat 405a, 405b, 405c, 405d can be completely surrounded by structural fibers 413a, 413b, 413c, 413d by using a closed loop configuration similar to the type shown in FIG. 5.

Figure 18:
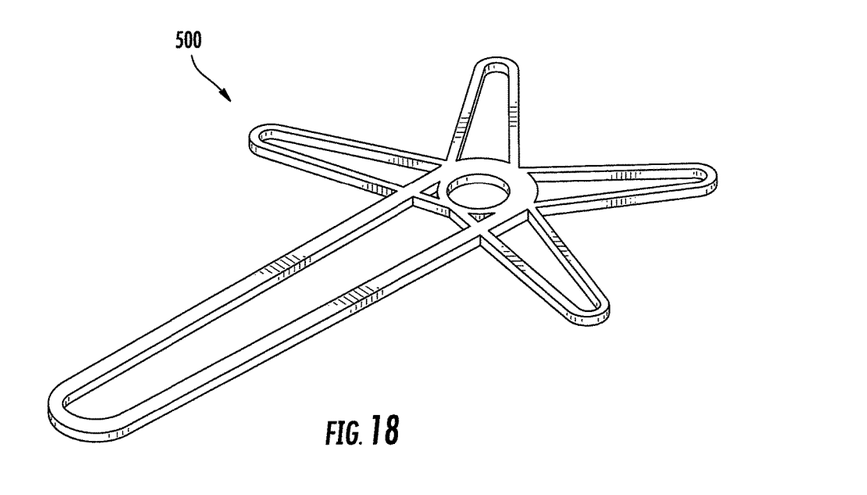
FIG. 18 represents an isometric view of a further alternate embodiment relative to the progression of the continuous layers of structural fibers in a branched pedal crank.

The same result can be obtained by the manufacturing of a pre-formed product 500, as shown in FIG. 18, where the continuous layers of structural fibers associated with the spokes and with the main body are on the same plane and substantially constitute a single element comet-shape. As is the previous embodiment, the intermediate product 500 can either be formed within the mold or can be formed separately using a mask which mirrors the shape of the pedal crank.

What is claimed is:

1. A semi-finished product for manufacturing an elongated body of a bicycle component having structural fibers incorporated in a matrix of polymeric material for mechanically coupling to at least one element of a bicycle and to transmit force, wherein the semi-finished product comprises:
- at least one first layer comprising continuous unidirectional structural fibers that are unidirectionally incorporated in a matrix of polymeric material,
- at least one second layer comprising small pieces of structural fibers incorporated in a matrix of polymeric material and randomly dispersed with respect to each other inside the at least one second layer, and
- a third layer of continuous unidirectional structural fibers arranged according to a direction complementary to a direction of said unidirectional fibers of said at least one first layer,
- wherein said at least one first layer and said at least one second layer overlap one another, and said at least one first layer and said at least one second layer are rolled around each other along a rolling axis.

2. The semi-finished product of claim 1, wherein said directions of said unidirectional fibers of said at least one first layer and third layer are +45° and −45° respectively.

3. The semi-finished product of claim 1, wherein said at least one first layer, said at least one second layer and third layer are arranged one next to the other wherein said at least one second layer is not between the other two.

4. The semi-finished product of claim 1, wherein said at least one first layer, said at least one second layer and said third layer of structural fibers are rolled along the rolling axis so that in rolled configuration said at least one first layer or said at least one second layer is on the outside.

5. The semi-finished product of claim 1, wherein the semi-finished product comprises any number of overlapping layers having structural fibers selected from the group consisting of: unidirectional fibers, fibers arranged at two or more incident angles forming a fabric configuration, fibers arranged complementary to the unidirectional fibers and fibers arranged +45° and −45° complementary to the unidirectional fibers.

6. An element body for use in manufacturing a bicycle component, the element body comprising:
a predetermined configuration formed of multiple, overlapping layers of polymeric material including:
- at least one first layer comprising continuous unidirectional structural fibers that are unidirectionally incorporated in a matrix of polymeric material,
- at least one second layer comprising small pieces of structural fibers randomly dispersed with respect to each other and incorporated in a matrix of polymeric material, and
- a third layer of continuous unidirectional structural fibers arranged according to a direction complementary to a direction of said unidirectional fibers of said at least one first layer,
- wherein said at least one first layer and said at least one second layer are rolled around each other along a rolling axis.

7. An element body for use in manufacturing a bicycle component, the element body comprising:
a predetermined configuration formed of:
(i) multiple, overlapping layers of polymeric material including:
- at least one first layer comprising continuous unidirectional structural fibers that are unidirectionally incorporated in a matrix of polymeric material,
- at least one second layer comprising small pieces of structural fibers randomly dispersed with respect to each other and incorporated in a matrix of polymeric material, and
- a third layer of continuous unidirectional structural fibers arranged according to a direction complementary to a direction of said unidirectional fibers of said at least one first layer; and
(ii) continuous winding of continuous layers of unidirectional fibers along suitable paths that define the element body's shape, wherein said at least one first layer and said at least one second layer are rolled around each other along a rolling axis.

* * * * *